Nov. 7, 1950     L. T. SACHTLEBEN     2,528,712
LENS MOUNTING
Filed Jan. 28, 1947     2 Sheets-Sheet 1
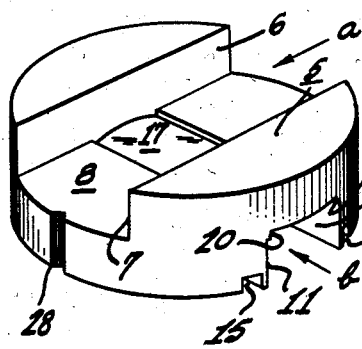
Fig.1.
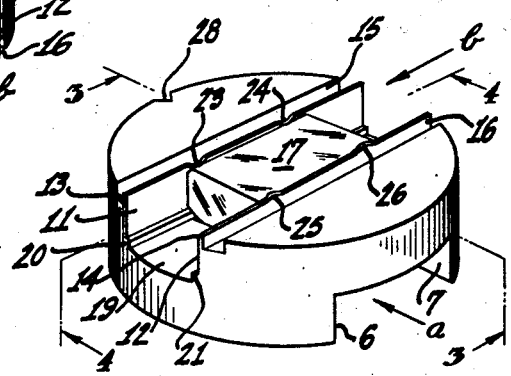
Fig.2.
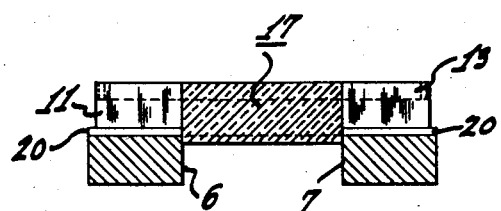
Fig.4.
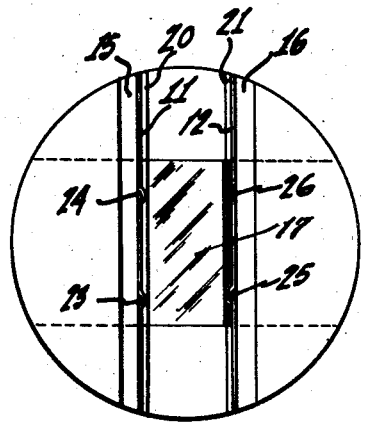
Fig.3.
Fig.5.
Inventor
LAWRENCE T. SACHTLEBEN
By
Attorney Nov. 7, 1950     L. T. SACHTLEBEN     2,528,712
LENS MOUNTING
Filed Jan. 28, 1947     2 Sheets-Sheet 2
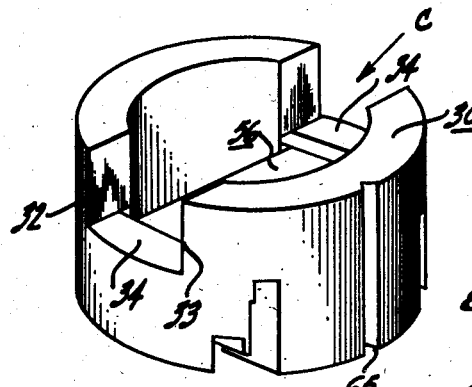
Fig. 6.
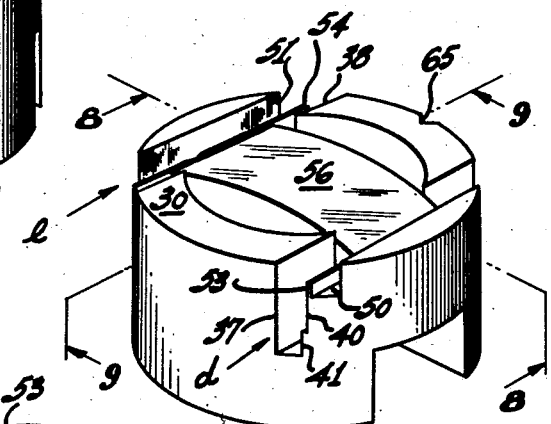
Fig. 7.
Fig. 8.
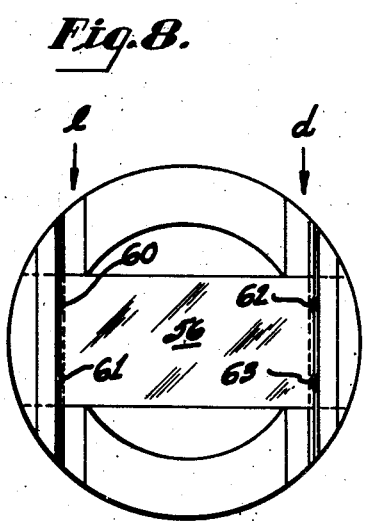
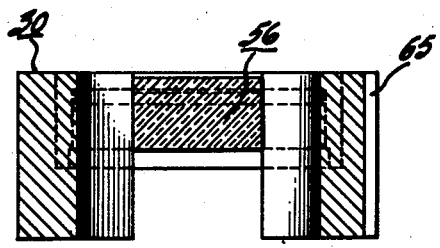
Fig. 9.
Fig. 10.
Inventor
LAWRENCE T. SACHTLEBEN
By   Orl K. Goshaw
Attorney Patented Nov. 7, 1950

2,528,712

UNITED STATES PATENT OFFICE 2,528,712

LENS MOUNTING

Lawrence T. Sachtleben, Haddonfield, N. J., assignor to Radio Corporation of America, a corporation of Delaware Application January 28, 1947, Serial No. 724,885

6 Claims. (Cl. 88—57)

This invention relates to optical devices, and particularly to mountings for cylindrical lenses.

In optical systems, particularly light concentrating and projection optical units, different types and shapes of lenses are employed. For instance, in sound recording and reproducing systems, light is formed into a beam and projected onto a film as a narrow line of light transverse of the direction of travel of the film. Therefore, many optical units of such systems employ cylindrical lenses. Since these lenses have axes of power which must be properly oriented with respect to the film motion, their mountings must permit rotational adjustment. Furthermore, these lenses are often rectangular, and it has been usual practice to mount them in mountings having broached rectangular holes which are difficult to produce compared with the type of construction described in detail hereinafter. The present invention permits the production of a compact, self-contained mounting having an opening which conforms to the rectangular form of the cylindrical lens. The opening is made simply by milling a slot across each end of the cylindrical blank, the slots being at right angles to one another. When the bottoms of these slots meet, a rectangular opening is formed. To maintain the rectangular cylindrical lens in position, thin fins of metal are provided along the edges of each slot, these fins being burnished over the edges of the lens to hold it in place as is done in spherical lens mountings for microscope objectives. Positive positioning in the quadrate direction is accomplished by suitably dimensioning the slots in relation to the form of the lens and its dimension in that direction.

Two forms of lens holders have been disclosed, one made from a solid cylindrical rod, and another from a hollow cylindrical rod or a cylindrical tube. It has been found that for small cylindrical lenses, a holder cut from a solid rod is preferable, while for the larger lenses, a tubular blank is more suitable.

The principal object of the invention, therefore, is to facilitate the mounting of rectangularly shaped cylindrical lenses.

Another object of the invention is to provide an improved mounting for cylindrical lenses.

A further object of the invention is to provide an improved method of and construction for a mounting for cylindrical lenses which avoids making a broached rectangular hole.

A still further object of the invention is to provide a cylindrical mounting having a rectangular opening therein produced by a slotting operation.

A still further object of the invention is to provide a mounting for rectangularly shaped cylindrical lenses which obscures the full aperture of the lens to a minimum extent.

A still further object of the invention is to provide a mounting for rectangularly shaped cylindrical lenses which is self-contained in one piece.

Although the novel features which are believed to be characteristic of this invention will be pointed out with particularity in the appended claims, the manner of its organization and the mode of its operation will be better understood by referring to the following description read in conjunction with the accompanying drawings forming a part hereof, in which:

Fig. 1 is a top perspective view of a lens holder embodying the invention.

Fig. 2 is a bottom perspective view of the holder shown in Fig. 1.

Fig. 3 is a cross-sectional view of the holder taken along the line 3—3 of Fig. 2.

Fig. 4 is a cross-sectional view of the holder taken along the line 4—4 of Fig. 2.

Fig. 5 is a bottom plan view of the holder shown in Figs. 1 and 2.

Fig. 6 is a top perspective view of a modification of the holder shown in Fig. 1.

Fig. 7 is a bottom perspective view of the holder shown in Fig. 6.

Fig. 8 is a cross-sectional view of the holder shown in Fig. 6 taken along the line 8—8 of Fig. 7.

Fig. 9 is a cross-sectional view of the holder shown in Fig. 6 taken along the line 9—9 of Fig. 7, and Fig. 10 is a bottom plan view of the holder shown in Figs. 6 and 7.

Referring now to the drawings, in which the same numerals identify like elements, a solid cylindrical rod of any suitable material such as brass may be cut into blanks 5 having a predetermined thickness. The blanks are then mounted in a milling machine and the first rectangular slots cut into them. A group of blanks may be mounted and cut simultaneously or each blank may be milled individually.

Referring now to blank 5, the first slot cut may be $a$, this slot having parallel sides 6 and 7 and a bottom 8. The blank 5 is then turned over in the milling machine and a second slot $b$ is cut at right angles to the first slot. This second slot is cut to a depth to meet slot $a$, thus forming a rectangular opening of a size depending upon the widths of the slots. As shown in Fig. 2, slot $b$ has parallel sides 11 and 12, the upper portions of the sides being thin fins 13 and 14, respectively. These fins are formed by milling narrow slots 15 and 16 parallel to and adjacent the upper corners of slot b.

To provide a support for a cylindrical lens 17, the bottom of the slot b is milled down at a narrower width to the bottom 19, forming two steps 20 and 21. The lens 17 is now placed in the rectangular opening formed by the intersection of the two slots a and b at right angles to one another and the fins 13 and 14 are burnished over, as shown at 23, 24, 25, and 26, to hold the lens 17 firmly in position in its mounting. In the milling of the slots a and b, the dimensions are in accordance with the size of the lens to be mounted, the distance between sides 6 and 7 being the length of the lens 17, and the distance between sides 11 and 12 being the width of the lens. The steps 20 and 21 are of such height that when the lens is seated upon them, its curved surface may extend into slot a, thus providing positive longitudinal location of the lens. The lens may have its base edges beveled, as shown in Fig. 3. To facilitate orientation of the lens 17 and to maintain it fixed in an adjusted position, a V-notch 28 may be milled on the circumference of the blank into which a lug or screw of the optical system may be inserted.

Referring now to Figs. 6 to 10, inclusive, showing another modification of the lens holder constructed in a similar manner, a blank 30 is cut from a cylindrical tube. This blank is then placed in a milling machine similar to the blank 5 and a slot c cut therein, the slot c being similar to slot a of blank 5. The slot c has parallel sides 32 and 33, and, because the blank is a tube, it has two bottom portions 34. The blank 30 is then turned over in the milling machine, and a pair of narrow slots d and e, each having a side 37 and a side 38, respectively, are cut at right angles to slot c and to a depth to meet the bottom of slot c. The upper portions of slots d and e are then widened to a predetermined depth to form stepped sides as shown at 40 and 41 for slot d. Two adjacent slots 50 and 51 are then milled to provide thin fins 53 and 54, the top edges of the fins being also milled to bring them flush with the upper edges of the lens 56. The slots 50 and 51 are similar to slots 15 and 16 in blank 5.

As shown in Figs. 8, 9, and 10, the lens 56 is mounted by setting its base on the steps 41 having fins 53 and 54 burnished over the upper edges of the lens, as shown at 60, 61, 62, and 63. (See Fig. 10.) A V-notch 65 is cut in the outer rim of the blank 30 to facilitate attachment and orientation of the mounting in the optical system.

The dimensions of the slots c, d, and e in the blank 30 depends upon the size of the lens to be mounted, the slot c having a width corresponding to the width of the lens and the distance between the sides 40 of slots d and e corresponding to the length of the lens. The distance between the sides 37 and 38 must be small enough in relation to the inside diameter of the blank 30 that the chords of the circular segments defined by their intersections with the inside diameter will be at least as long as the width of lens 56 to permit the lens to enter the mount and seat on steps 41. In the preferred form, the chords will equal the lens width, and thereby, provide positive lateral location of the lens.

From the above description, it will be observed that by simple turning and slotting operations, self-contained cylindrical lens mounts may be quickly and economically manufactured to accommodate any size of lens, thus eliminating the necessity of making a broached rectangular hole in the mountings for rectangular lenses. Also, the full aperture of the lens is not obscured at all in one plane, and only slightly by the burnished fins in the quadrate plane.

I claim:

1. A lens mounting comprising a blank having a cylindrical external surface configuration and provided with a slot across one end and at least a second slot across the other end, said second slot being at right angles to said first slot, and said slots being cut to a depth where they intersect to form a rectangular opening, shoulders at the bottom of said second slot to hold a lens in a fixed position in said opening, and a pair of fins along the sides of said second slot.

2. A lens mounting comprising a cylindrical blank having slots on opposite ends thereof cut at right angles to one another and to a depth where the bottom of said slots meet to form a rectangular opening, means for holding a lens in a fixed position in said opening, a pair of fins cut along the sides of one of said slots, and means on said fins for securing said lens in said opening.

3. A lens mounting in accordance with claim 2, in which said first mentioned means is a pair of stepped portions running parallel along the bottom of one of said slots to form a seat for said lens mounted in said rectangular opening.

4. A lens mounting comprising a blank having a slot across one end thereof and a plurality of slots at right angles to said first slot across the other end of said blank, the bottom of said first mentioned slot intersecting the bottom of one of said plurality of slots, a pair of fins along one side of each of a pair of said plurality of slots, and means on said fins for securing said lens in said mounting.

5. A lens mounting in accordance with claim 4, in which said pair of slots have stepped sides to form a seat for a lens adapted to be mounted in said blank.

6. A lens mounting comprising a cylindrical, tubular blank having a slot cut across the central portion of one end thereof and a pair of narrow stepped slots cut across the other end of said blank, said stepped slots being separated and at right angles to said first slot and having their bottoms co-planar with the bottom of said first slot, and a pair of fins along one side of each of said pair of slots.

LAWRENCE T. SACHTLEBEN.

REFERENCES CITED

The following references are of record in the file of this patent:

UNITED STATES PATENTS

| Number | Name | Date |
| --- | --- | --- |
| 1,692,973 | Babcock | Nov. 27, 1928 |
| 1,958,996 | Hansen et al. | May 15, 1934 |
| 2,019,152 | Mawrer | Oct. 29, 1935 |
| 2,141,317 | Sabel | Dec. 27, 1938 |
| 2,143,813 | Wood | Jan. 10, 1939 |
| 2,236,509 | Manderfeld | Apr. 1, 1941 |
| 2,364,495 | Victor | Dec. 5, 1944 |
| 2,428,399 | Timoney | Oct. 7, 1947 |